United States Patent

Broome et al.

[15] 3,679,971

[45] July 25, 1972

[54] DIGITAL WAVEFORM GENERATOR WITH ADJUSTABLE TIME SHIFT AND AUTOMATIC PHASE CONTROL

[72] Inventors: Marshall B. Broome, Tulsa, Okla.; William W. Burress, Dallas, Tex.

[73] Assignee: Atlantic Richfield Company

[22] Filed: June 3, 1971

[21] Appl. No.: 149,510

Related U.S. Application Data

[62] Division of Ser. No. 874,206, Nov. 5, 1969, Pat. No. 3,619,793.

[52] U.S. Cl. ....................324/0.5 R
[51] Int. Cl. ....................G01n 27/78
[58] Field of Search...........324/0.5 R, 0.5 A, 0.5 AC, 0.5 AH

[56] References Cited

UNITED STATES PATENTS 3,467,856 9/1969 Hearn ....................324/0.5
3,524,128 8/1970 Hearn ....................324/0.5

*Primary Examiner*—Michael J. Lynch
*Attorney*—Blucher S. Tharp, Robert E. Lee, Jr., Roderick W. MacDonald and M. David Folzenlogen

[57] ABSTRACT

A circuit for generating two pulse waveforms having a desired time and phase relationship, and an optically pumped magnetometer utilizing that circuit. A synchronization signal toggles a bistable multivibrator to provide one pulse waveform. The synchronization signal also triggers a monostable multivibrator, the output of which toggles a second bistable multivibrator to provide the second pulse waveform. The time the monostable multivibrator remains in its unstable state determines the desired time relationship between the two waveforms. Should the waveforms assume the wrong phase relationship, gating circuitry returns them to the proper phase relationship. The circuit can be utilized to provide a phase reference signal and a sweep control signal in an optically pumped magnetometer, giving the desired time and phase relationship between those two signals.

8 Claims, 3 Drawing Figures

INVENTORS
MARSHALL B. BROOME
WILLIAM W. BURRESS

DIGITAL WAVEFORM GENERATOR WITH ADJUSTABLE TIME SHIFT AND AUTOMATIC PHASE CONTROL

CROSS REFERENCE TO RELATED APPLICATIONS

This application is a division of application Ser. No. 874,206 filed Nov. 5, 1969, now U.S. Pat. No. 3,619,795.

The present invention pertains to a pulse generating circuit and to a magnetometer system utilizing that pulse generating system. More particularly, the present invention pertains to a circuit for generating periodic output pulses on a plurality of output lines with an adjustable time relationship between the pulses on the output lines. In a second aspect, the invention pertains to an improved optically pumped magnetometer system utilizing that waveform generator to assure a proper relationship between timing pulses required in different portions of the magnetometer system.

In numerous applications it is desired to have a plurality of periodic pulse waveforms with a fixed time relationship between the waveforms. One such application is in optically pumped magnetometers. A typical such magnetometer includes a source of radiation, a radiation absorption cell through which the source of radiation is directed, and a radiation detector on which the radiation impinges after passing through the absorption cell. Circuitry is included to cause a radio frequency magnetic field within the absorption cell. Absorption of radiation within the cell is a function of the frequency of the locally introduced radio frequency field and is indicative of the ambient magnetic field in which the magnetometer is situated. The amount of absorption within the cell is determined by monitoring the output of the radiation detector. Thus the frequency of the locally induced radio frequency field is swept through a limited range, and the radiation detector output is monitored. The radio frequency at which the radiation absorption is a maximum is indicative of the intensity of the ambient magnetic field. Variations on this basic optically pumped magnetometer include utilization of lenses and filters to optimize the signal to noise ratio and include use of the radiation detector output as the source of the locally induced radio frequency field, resulting in a self-oscillating magnetometer.

A simple means for generating periodic pulse waveforms with a fixed time relationship is to utilize a clock or synchronization signal to toggle a first bistable multivibrator and to trigger a monostable multivibrator, the output of which toggles a second bistable multivibrator. The monostable multivibrator thus produces a fixed time delay between the toggling of the fist bistable multivibrator and toggling of the second bistable multivibrator. When such a circuit is initially activated, however, the two bistable multivibrators might not start operation with the desired phase relationship, with the result that the relation between the two waveforms is 180° out of phase with the desired relationship. In addition, spurious pulses or noise within the system might cause one of the bistable multivibrators to toggle, thereby introducing a 180° error in the time or phase relationship of the two output pulse waveforms.

A second method of providing two pulse waveforms having a fixed time relationship is to utilize a clock or synchronization signal to toggle a bistable multivibrator and to drive a first monostable multivibrator, the output of which drives a second monostable multivibrator. The output of this second monostable multivibrator, then, is a series of pulses which are adjusted to have the same period as the bistable multivibrator output pulses and to have the desired time relationship with respect to the output of the bistable multivibrator. However, the monostable multivibrator output has slower rise and fall times than does the bistable multivibrator output. As a result, the pulse width of the monostable multivibrator output is not constant.

The present invention is a circuit for providing a plurality of periodic pulse waveforms having sharp rise and fall times and with fixed time relationship and including means to assure that the phase relationship between the two waveforms is not permitted to become 180° different from the desired phase relationship. In accordance with the present invention, a clock or synchronization signal toggles a first bistable multivibrator and drives a monostable multivibrator. The monostable multivibrator in turn toggles a second bistable multivibrator. A gating circuit provides an output when the two bistable multivibrator outputs do not have the desired time relationship. The gating circuit output is utilized to bring the two bistable multivibrator outputs back to the desired relationship.

In a second aspect, the present invention is an optically pumped magnetometer utilizing the first output from the pulse waveform generator of the present invention to drive the magnetometer phase detector and utilizing the second output from the pulse waveform generator to provide a sweep signal for the magnetometer radio frequency generator.

These and other aspects and advantages of the present invention are apparent in the following detailed description and claims, particularly when considered in conjunction with the accompanying drawings in which like parts bear like reference numerals. In the drawings:

Figure 2:
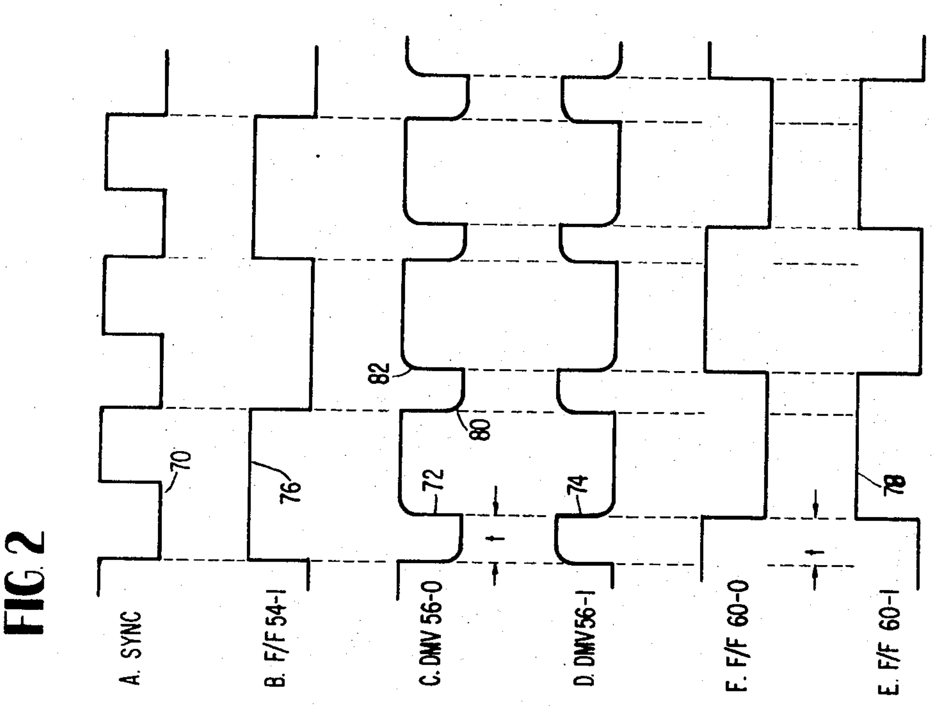
FIG. 2 depicts waveforms found at various points within the circuit of FIG. 1.
Figure 1:
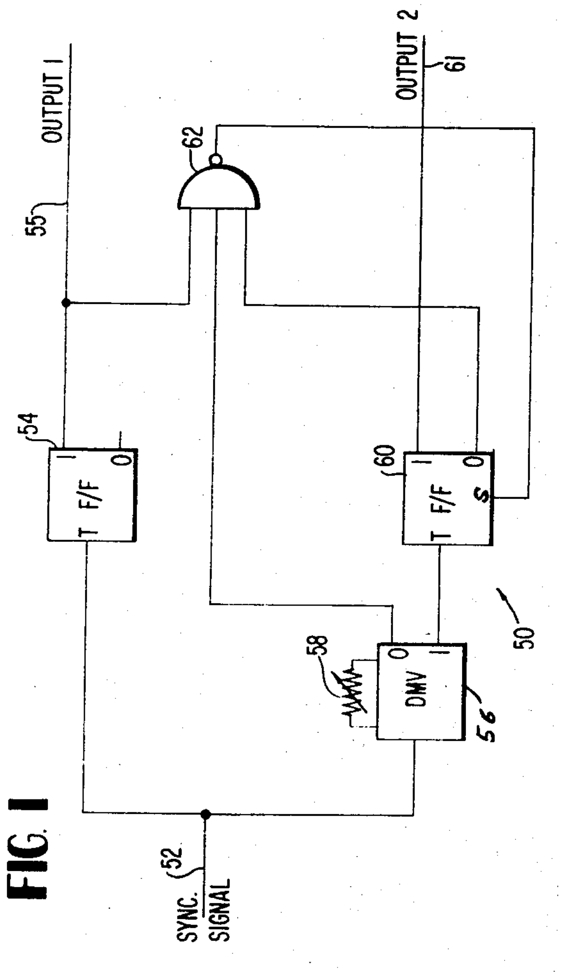
FIG. 1 is a block diagram of a waveform generating circuit in accordance with the present invention.

As depicted in FIG. 1, waveform generating circuit 50 utilizes a clock or synchronization signal provided on input line 52 which might be received from an external source or which might be obtained from a local synchronization signal generator. In the illustrative example of the present invention it is assumed that the synchronization signal on line 52 is a periodic pulse waveform as depicted in FIG. 2A. That synchronization signal is applied by line 52 to the symmetrical triggering or toggle input of bistable multivibrator or flip-flop 54. Accordingly, with each negative pulse on line 52, the one output of flip-flop 54 changes state as depicted in FIG. 2B. This one output of flip-flop 54 is applied to output line 55 as the first periodic pulse waveform output of circuit 50.

This synchronization input signal on line 52 is also applied as an input to monostable multivibrator or delay multivibrator (DMV) 56. Preferably the timing circuitry within DMV 56 includes variable means such as variable resistor 58 to permit controlled variation of the time delay introduced by the DMV. The one output of DMV 56 is connected to the trigger input of flip-flop 60. The one output of flip-flop 60 is applied to output line 61 as the second periodic pulse waveform output of circuit 50.

The one output of flip-flop 54 is connected to the first input of three input of NAND gate 62 which additionally receives as inputs the zero output of DMV 56 and the zero output of flip-flop 60. The output of NAND gate 62 is connected to the set input of flip-flop 60. There are no connections to the reset input of flip-flop 60 or to the set input, the reset input and the zero output of flip-flop 54.

In the quiescent condition of DMV 56, the DMV zero output is at a positive level as depicted in FIG. 2C, and the DMV one output is at a negative level, as depicted in FIG. 2D. When the synchronization input signal on line 52 goes negative, such as upon initiation of pulse 70 depicted in FIG. 2A, the DMV 56 zero output becomes negative, as depicted by pulse 72 in FIG. 2C. This negative pulse has a time duration $t$ determined by the adjustment of variable resistor 58. Likewise, the one output of DMV 56 becomes positive, as depicted at pulse 74 in FIG. 2D, and remains positive for that same time duration $t$. When DMV 56 returns to its stable state, its one output becomes negative and triggers flip-flop 60 to cause that flip-flop to change states. Pulse 70 has also triggered flip-flop 54. Thus, if initially both the one output of flip-flop 54 and the one output of flip-flop 60 were negative as depicted in FIGS. 2B and 2E, respectively, then upon initiation of pulse 70, the one output of flip-flop 54 becomes positive, as depicted by pulse 76 in FIG. 2B, and after a time $t$, DMV 56 has returned to its stable state and the one output of flip-flop 60 becomes positive, as depicted by pulse 78 in FIG. 2E. The flip-flop 54 one output depicted in FIG. 2B and the flip-flop 60 one output depicted in FIG. 2E thus provide the two periodic pulse output waveforms on output lines 55 and 61 of circuit 50. These two output waveforms are in phase in that their corresponding pulses, such as pulses 76 and 78, are in phase. Thus, following the return of DMV 56 to its stable state, these two waveforms are either both positive or both negative. The time relationship $t$ between the two waveforms is determined by the length of time $t$ DMV 56 remains in its unstable state which in turn is determined by the adjustment of variable resistor 58.

Due to the inherent characteristics of monostable multivibrators, DMV 56 outputs might not be sharp, square pulses, but instead might be slightly rounded pulses, as illustratively depicted at points 80 and 82 in FIG. 2C. While pulses with such rounding are not suited for the output from circuit 50, they are suitable for the triggering of flip-flop 60 which can be adjusted to respond to the pulses at a level not affected by the rounding and which provides sharp pulses.

During normal operation of circuit 50, NAND gate 62 provides a continuous positive output to the set input of flip-flop 60. As a consequence, flip-flop 60 does not respond to its set input but instead responds to the trigger pulses applied to its trigger input from DMV 56. The output of gate 62 cannot change state while the zero output of DMV 56 is negative. When DMV 56 is in its stable state and its zero output is applying a positive signal to NAND gate 62, then under normal operation either the one output of flip-flop 54 or the zero output of flip-flop 60 is positive, provided the two circuit 50 output waveforms on lines 55 and 61 are in phase. Therefore, NAND gate 62 always provides a continuous positive output during the time the circuit output signals are in phase. Should a spurious pulse or other noise within circuit 50 trigger either flip-flop 54 or flip-flop 60 so that the two outputs of circuit 50 no longer have the desired phase relationship, NAND gate 62 applies a pulse to the set input of flip-flop 60 to bring the two circuit 50 outputs back into the desired phase relationship. Thus, should either flip-flop 54 or flip-flop 60 be triggered by noise, then the one output of flip-flop 54 and the zero output of flip-flop 60 become in phase, and when these two outputs both apply positive signals to NAND gate 62, the output of NAND gate 62 goes negative upon DMV 56 being in its stable state. This negative signal from gate 62 is applied to the set input of flip-flop 60, causing flip-flop 60 to change state so that its zero output is negative. Therefore, the one output of flip-flop 60 is again of the same phase as is the one output of flip-flop 54. Accordingly, the two outputs of circuit 50 are returned to desired phase relationship.

Figure 3:
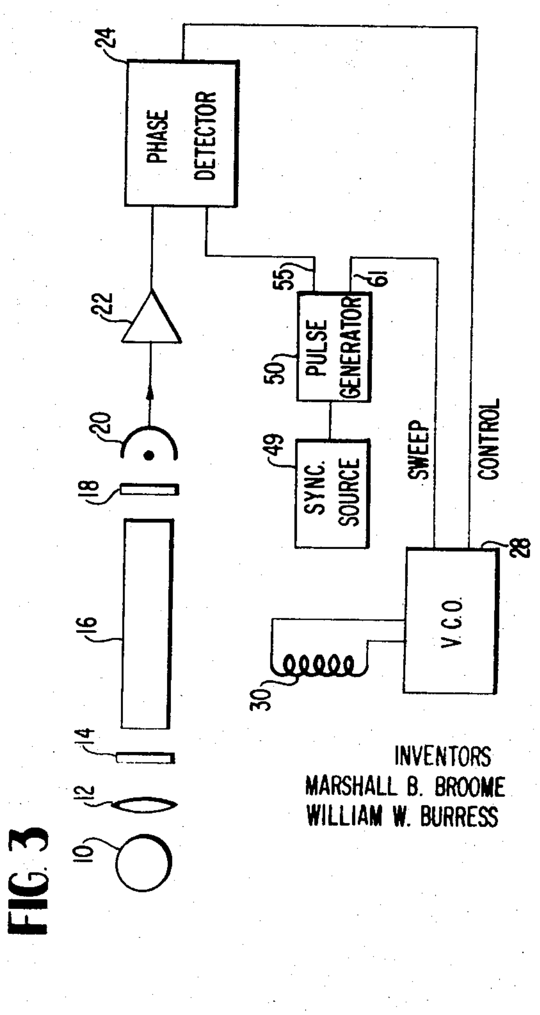
FIG. 3 is a block diagram of an optically pumped magnetometer system incorporating the present invention.

FIG. 3 depicts an optically pumped magnetometer utilizing a waveform generating circuit 50 to provide signals with the desired phase relationship. Radiation from a source 10, which by way of example could be a helium lamp, passes through a lens 12, a circular polarizer 14, and into a radiation absorption cell 16. Cell 16 is filled at a reduced pressure with a gas which is excited to a metastable state, for example, by means of energizing electrodes (not shown). If radiation source 10 is a helium lamp, then by way of example, absorption cell 16 could be filled with helium gas.

Radiation emerging from absorption cell 16 passes through filter 18 to radiation detector 20. Filter 18 is a radiation filter passing a selected wave length to increase the signal to noise ratio of the apparatus. If radiation source 10 is a helium lamp, then filter 18 is selected to pass the 1.08$\mu$ wave length of the helium radiation, and detector 18 must be able to detect that 1.08$\mu$ wave length radiation.

The electrical signal output of radiation detector 20 is applied as an input to amplifier 22 which has its output tied to one input of phase detector 24. Pulse generator 50 receives synchronization or triggering signals at the desired frequency or repetition rate from synchronization source 49. Output line 55 from pulse generator 50 applies a first pulse waveform to the second input of phase detector 24. The output of phase detector 24 is connected to the control input of voltage controlled oscillator 28. Output line 61 from pulse generator 50 applies a second pulse waveform input signal to voltage controlled oscillator 28. The output of oscillator 28 is applied to coil 30 to produce a radio frequency magnetic field within absorption cell 16.

The gas within absorption cell 16 is excited to its metastable state, and radiation from source 10 passes through it. The radio frequency magnetic field caused by current in coil 30 causes the gas within absorption cell 16 to return to its stable state. In returning to the stable state, the gas within cell 16 absorbs some of the radiation passing through cell 16 from radiation source 10 to radiation detector 20. The frequency of the RF magnetic field at which that absorption is a maximum is indicative of the intensity of the magnetic field in which absorption cell 16 is located. Pulse generator 50 causes the frequency of the output from voltage controlled oscillator 28 to sweep through a limited frequency range including the frequency of maximum radiation absorption. The signal applied from radiation detector 20 through amplifier 22 to the first input of phase detector 24 includes a component at the sweep frequency. Phase detector 24 detects the sweep frequency signal and provides a control signal for voltage controlled oscillator 28 to control the frequency of the output of oscillator 28 so that it is always at the frequency causing maximum absorption of radiation within absorption cell 16.

The pulse waveform voltage applied to oscillator 28 by line 61 from pulse generator 50 must be compatible with the signal applied to oscillator 28 from phase detector 24, as determined by the pulse waveform applied to phase detector 24 on line 55 from pulse generator 50. While theoretically this would mean that the pulse waveforms on lines 55 and 61 should be exactly in phase—i.e. the time relationship $t$ should be zero—the inherent characteristics of amplifier 22 and phase detector 24 result in a slight phase shift or time delay in the signal applied to voltage controlled oscillator 28 from phase detector 24. This delay, for example, might be equivalent to 30° of phase shift. It is, therefore, necessary that the pulse waveform on line 61 be slightly delayed in time with respect to the pulse waveform on line 55, as illustrated by the waveforms of FIGS. 2B and 2E. Circuit 50 permits the required time relationship $t$ to be obtained. By means of the variable resistor 58, this time relationship can be set as required. In addition, the output of NAND gate 62 ensures that the pulse waveforms on lines 55 and 61 maintain the required phase relationship. Accordingly, the output of voltage controlled oscillator 28 is swept through the desired frequency range to determine the frequency of maximum absorption within absorption cell 16.

WHAT IS CLAIMED IS:

1. In a magnetometer having source means for the emission of resonance radiation, radiation cell means having radiation from the source means directed therethrough to produce alignment of atoms in the cell means, generating means for producing an alternating magnetic field in the cell means of a frequency which diminishes the alignment of the atoms, and radiation detection means for producing an output proportional to the intensity of impinging radiation from the source means which passes through the cell means, the improvement comprising a pulse generator for generating first and second pulse waveforms having a preset phase relationship and a preset time relationship, said pulse generator including:

a source of triggering signals;

first pulse circuit means connected to said source and to said radiation detection means for generating a first pulse waveform in response to triggering signals and applying that first pulse waveform as a reference signal to said radiation detection means;

second pulse circuit means connected to said source and to said generating means for generating a second pulse waveform in response to triggering signals and applying that second pulse waveform to said generating means to alter the frequency of the alternating magnetic field, said second pulse circuit means including control means for maintaining a preset time relationship between corresponding pulses in the first and second pulse waveforms; and gating means connected to said first and second pulse circuit means and responsive to the first and second pulse waveforms for maintaining the waveforms in a preset phase relationship.

2. Apparatus as claimed in claim 1 in which said second pulse circuit means comprises:

a monostable multivibrator having an input connected to said source and having an output; and a bistable multivibrator having a symmetrical triggering input connected to said monostable multivibrator output.

3. Apparatus as claimed in claim 2 in which said gating means comprises a NAND gate having a first input connected to said first pulse circuit means to receive the first pulse waveform therefrom, having a second input connected to said bistable multivibrator to receive the second pulse waveform therefrom, and having a third input connected to said monostable multivibrator output, said NAND gate applying a setting signal to said bistable multivibrator to change the state thereof when said first and second pulse waveform have a phase relationship other than said preset phase relationship during the time said monostable multivibrator is in its stable state.

4. Apparatus as claimed in claim 3 in which said first pulse circuit means comprises a further bistable multivibrator having a symmetrical triggering input connected to said source.

5. Apparatus comprising source means for the emission of resonance radiation; radiation cell means having radiation from the source means directed therethrough to produce alignment of atoms in the cell means; generating means for producing an alternating magnetic field in the cell means of a frequency which diminishes the alignment of the atoms;

radiation detection means for producing an output proportional to the intensity of impinging radiation from the source means which passes through the cell means;

a pulse generator for generating first and second pulse waveforms having a preset phase relationship and a preset time relationship, said pulse generator including a source of triggering signals, first pulse circuit means connected to said source and to said radiation detection means for generating a first pulse waveform in response to triggering signals and applying that first pulse waveform as a reference signal to said radiation detection means, second pulse circuit means connected to said source and to said generating means for generating a second pulse waveform in response to triggering signals and applying that second pulse waveform to said generating means to alter the frequency of the alternating magnetic field, said second pulse circuit means including control means for maintaining a preset time relationship between corresponding pulses in the first and second pulse waveforms; and gating means connected to said first and second pulse circuit means and responsive to the first and second pulse waveforms for maintaining the waveforms in a preset phase relationship.

6. Apparatus as claimed in claim 5 in which said second pulse circuit means comprises:

a monostable multivibrator having an input connected to said source and having an output; and a bistable multivibrator having a symmetrical triggering input connected to said monostable multivibrator output.

7. Apparatus as claimed in claim 6 in which said gating means comprises a NAND gate having a first input connected to said first pulse circuit means to receive the first pulse waveform therefrom, having a second input connected to said bistable multivibrator to receive the second pulse waveform therefrom, and having a third input connected to said monostable multivibrator output, said NAND gate applying a setting signal to said bistable multivibrator to change the state thereof when said first and second pulse waveform have a phase relationship other than said preset phase relationship during the time said monostable multivibrator is in its stable state.

8. Apparatus as claimed in claim 7 in which said first pulse circuit means comprises a further bistable multivibrator having a symmetrical triggering input connected to said source.

* * * * *